(12) United States Patent
Bhaduri et al.

(10) Patent No.: US 7,265,074 B2
(45) Date of Patent: Sep. 4, 2007

(54) SINGLE STEP PROCESS FOR THE PREPARATION OF LOWER α-ALKENE POLYMERIZATION HETEROGENEOUS SOLID CATALYST

(75) Inventors: Sumit Bhaduri, Mumbai (IN); Virendra Kumar Gupta, Mumbai (IN); Krishna Sarma, Mumbai (IN)

(73) Assignee: Reliance Industries Limited, Mumbai (IN)

( * ) Notice: Subject to any disclaimer, the term of this patent is extended or adjusted under 35 U.S.C. 154(b) by 106 days.

(21) Appl. No.: 10/552,217

(22) PCT Filed: Apr. 10, 2003

(86) PCT No.: PCT/IN03/00152

§ 371 (c)(1),
(2), (4) Date: Oct. 6, 2005

(87) PCT Pub. No.: WO2004/089998

PCT Pub. Date: Oct. 21, 2004

(65) Prior Publication Data

US 2006/0217503 A1 Sep. 28, 2006

(51) Int. Cl.
*C08F 4/626* (2006.01)
*C08F 4/64* (2006.01)

(52) U.S. Cl. .................. 502/115; 502/118; 526/124.2; 526/124.3

(58) Field of Classification Search ................ 502/115, 502/118; 526/124.2, 124.3
See application file for complete search history.

(56) References Cited

U.S. PATENT DOCUMENTS 5,075,396 A * 12/1991 Kashiwa et al. ......... 526/125.3

FOREIGN PATENT DOCUMENTS

GB 1530445 11/1978

* cited by examiner

*Primary Examiner*—Caixia Lu
(74) *Attorney, Agent, or Firm*—Klein, O'Neill & Singh, LLP; Howard J. Klein

(57) ABSTRACT

Single step process for the preparation of lower α-alkene polymerisation heterogeneous solid catalyst, wherein the procatalyst is obtained by reacting organomagnesium precursor and titanium tetrahalide or titanium haloalkoxo species of the formula Ti(OR)m Xn, with a hydrocarbon or halohydrocarbon solvent and internal electron donor and optionally an acid halide under microwave irradiation of 300 to 1200 W. The mole ratio of the organomagnesium precursor to the titanium tetrachloride or titanium haloalko species is 1:6 to 1:20 and the mole ratios of the electron donor and acid halide to titanium is 0.3 to 1.5 and 0.02 to 0.2, respectively.

24 Claims, No Drawings

SINGLE STEP PROCESS FOR THE PREPARATION OF LOWER α-ALKENE POLYMERIZATION HETEROGENEOUS SOLID CATALYST

CROSS-REFERENCE TO RELATED APPLICATION

This application is the national stage entry, under 35 U.S.C. §371(c), of International Application No. PCT/IN2003/000152, filed 10 Apr. 2003, the disclosure of which is incorporated herein by reference.

This invention also relates to lower α-alkene polymerisation heterogeneous solid catalyst obtained by the single step process and process for the polymerization of lower α-alkene using the heterogeneous solid catalyst.

BACKGROUND ART

Polymers of lower α-alkene or olefins such as ethylene, propylene or 1-butene find applications in the manufacture of a variety of articles including plastic bags or sheets or automobile parts. Of particular interest in polymer production are polyethylene and polypropylene with a high degree of isotacticity i.e. the extent of orientation of the branched groups in the polymer in the same direction, which shows high crystallinity. The polymerisation involves reacting the lower α-alkene such as ethylene or propylene with catalyst under polymerisation conditions. The early polymerisation on catalysts were of relatively low activity and the polymers formed contained significant amounts of the catalyst residues, which had to be removed by deashing. The more recent alkene polymerisation catalysts are of two types viz. single site catalysts and heterogeneous solid catalysts. The single site catalysts comprise metallocene and non-metallocene complexes of transition metals and a cocatalyst such as methyl aluminoxane and produces polymer of low polydispersity.

Heterogeneous solid catalysts are the most commonly used catalysts, especially in the bulk production of polyethylene or polypropylene due to their high activity and ease of operation. These catalysts are sometimes referred to as heterogeneous Ziegler-Natta catalysts. A heterogeneous solid catalyst comprises a procatalyst and a cocatalyst and for polypropylene with high isotacticity an external selectivity control agent or external electron donor also. The cocatalyst may be an organoaluminium compound such as alkyl aluminium. The physicochemical properties of the procatalyst play a pivotal role in the overall performance of the catalysts. The procatalysts comprise organomagnesium or magnesium chloride derived precursor comprising magnesium chloride supported titanium chloride and an internal electron donor. The procatalysts are synthesised by halogenation of an organomagnesium compound such as magnesium ethoxide with a halogenating agent such as titanium tetrahalide in a hydrocarbon or halohydrocarbon solvent such as toluene or chlorobenzene optionally with an acid halide to form magnesium chloride. The magnesium chloride so obtained is reacted with titanium haloalkoxide or excess titanium tetrahalide, usually titanium tetrachloride in the presence of a hydrocarbon or a halohydrocarbon solvent. To this an internal electron donor is added simultaneously or sequentially to result in a procatalyst U.S. Pat. Nos. 4,400,302, 4,414,132, 4,497,905, 4,535,068, 4,657,995, 4,710,482, 4,728,705, 4,771,024, 4,804,648, 4,870,039, 4,914,069, 4,870,040, 5,066,737, 5,077,357, 5,106,806, 5,082,907, 5,122,494, 5,124,298, 5,141,910, 5,151,399 and 5,229,342.

In most of the above processes employing organomagnesium compounds or silica coated with organomagnesium compounds, the procatalyst preparation involves treatment of the magnesium precursor with titanium tetrahalide more than once, so that catalysts of optimum titanium loading and activity are obtained. U.S. Pat. Nos. 4,400,302 and 4,414,132 teach that at least two treatments with titanium tetrahalide are required for catalysts with high activity. In U.S. Pat. Nos. 4,497,905, 4,535,068 and 4,657,995, where a halogenating agent is used to enhance activity, several treatments with titanium tetrachloride are described. The total amount of titanium tetrahalide required for multiple treatments are also considerable.

Procatalyst also may be prepared by milling together anhydrous magnesium chloride, a titanium tetrahalide such as titanium tetrachloride and for polypropylene catalyst an internal electron donor U.S. Pat. Nos. 4,329,253, 4,393,182 and 4,419,501. Preparation of procatalysts by this physical method requires very long milling time. Furthermore when used in polymerisation reactions, procatalysts obtained by milling in general show activities and selectivities inferior to those obtained by chemical method.

Several processes and products employing microwave energy are reported in patent literatures. PCT Publication No WO2001028771 describes microwave curable compositions comprising at least one heat curable resin component, microwave absorbable particles in an amount of about 10% of the composition, and at least one curing agent for the heat curable resin component. European Patent no 992480 describes the preparation of methacrylate and polyester methacrylates in the presence of a catalyst and inhibitor under microwave heating. U.S. Pat. Nos. 6,017,845 and 6,171,479 describe a process that involves a catalyst comprising a support, a microwave absorption material and catalytically active phase. On heating the catalyst with a source of microwave energy, the microwave absorption material absorbs the energy and increases the temperature of the catalyst to the desired level. The heated catalyst is contacted with a hydrocarbon feedstock for upgrading. PCT Publication No WO 9743230 describes a method for palladium catalyzed organic reactions heated with microwave energy in solution. U.S. Pat. No. 5,194,514 describes the use of microwave in the presence of paramagnetic catalysts to increase molecular weight of the polymer. U.S. Pat. No. 5,719,095 describes supported catalyst system comprising support, at least one metallocene catalyst fixed to the support, and at least one cocatalyst, wherein the catalyst is fixed to the support by bringing the catalyst into contact with a supported cocatalyst in a suspension and irradiating with microwaves.

OBJECTS OF INVENTION

An object of the invention is to provide single step process for the preparation of lower α-alkene polymerisation heterogeneous solid catalyst which simplifies the preparation procedure and shortens the preparation time.

Another object of the invention is to provide single step process for the preparation of lower α-alkene polymerisation heterogeneous solid catalyst which reduces the amount of titanium tetrahalide required and is economical.

Another object of the invention is to provide single step process for the preparation of lower α-alkene polymerisation heterogeneous solid catalyst, which when used in polymerisation of ethylene and propylene shows high activity and selectivity and for propylene results in polymers with high isotacticity index.

DETAILED DESCRIPTION OF INVENTION

According to the invention there is provided a single step process for the preparation of lower α-alkene polymerisation heterogeneous solid catalyst comprising an organomagnesium precursor derived procatalyst comprising magnesium chloride supported titanium chloride and an internal electron donor and an organoaluminium compound based cocatalyst, wherein the mole ratio of aluminium the cocatalyst to titanium in the procatalyst is 10-3000:1 and the procatalyst is obtained by single step reaction of organomagnesium precursor and titanium tetrahalide or titanium haloalkoxo species of the formula Ti(OR)m Xn, wherein R is methyl, ethyl, normal or isopropyl, normal or isobutyl, preferably n-butyl, X is chlorine or bromine, preferably chlorine and m+n=4 with the condition that when m=1–4, n=3–0 respectively with a hydrocarbon or halohydrocarbon solvent and internal electron donor and optionally an acid halide under microwave irradiation of 300 to 1200 W followed by isolating the procatalyst, the mole ratio of the organomagnesium precursor to the titanium tetrachloride or titanium haloalko species being 1:6 to 1:20 and the mole ratios of the electron donor and acid halide to titanium being 0.3 to 1.5 and 0.02 to 0.2, respectively.

According to the invention there is also provided a single step process for the preparation of polypropylene polymerisation heterogeneous solid catalyst comprising an organomagnesium precursor derived procatalyst comprising magnesium chloride supported titanium chloride and an internal electron donor and an organoaluminium compound based cocatalyst and a selectivity control agent, wherein the mole ratio of aluminium in the cocatalyst to titanium in the procatalyst is 10-3000:1 and the mole ratio of selectivity control agent to titanium is 10-100:1 and the procatalyst is obtained by single step reaction of organomagnesium precursor and titanium tetrahalide or titanium haloalkoxo species of the formula Ti(OR)m Xn, wherein R is methyl, ethyl, normal or isopropyl, normal or isobutyl, preferably n-butyl, X is chlorine or bromine, preferably chlorine, m=0 and n=4 with a hydrocarbon or halohydrocarbon solvent and an internal electron donor and optionally an acid halide under microwave irradiation of 300 to 1200 W followed by isolating the procatalyst, the mole ratio of the organomagnesium precursor to the titanium tetrachloride or titanium haloalko species being 1:6 to 1:20 and the mole ratios of the electron donor and acid halide to titanium being 0.3 to 1.5 and 0.02 to 0.2 respectively.

Preferably the mole ratio of the aluminium in the cocatalyst to the titanium the procatalyst of the catalyst is 200:1.

The heterogeneous solid procatalyst may have a surface acrea of 40-300 m$^2$/g, preferably 50-200 m$^2$/g.

The titanium tetra halide may be titanium tetra chloride or bromide, preferably titanium tetra chloride.

The organomagnesium precursor such as magnesium ethoxide and anhydrous magnesium chloride used for preparation of the procatalyst are commercially available or prepared in known manner. Other magnesium alkoxides such as methoxide, normal and isopropoxide, normal and isobutoxide and 2-ethyl butoxide may also be used but the preferred organomagnesium precursor is magnesium ethoxide.

The hydrocarbon or halohydrocarbon solvent used in the reaction must be capable of absorbing microwave energy and may be hexane, methyl cyclohexane, toluene, xylene, chlorobenzene, dichlorobenzene or o-chlorotoluene, the preferred solvent being chlorobenzene.

Preferably, a microwave energy of 300 W is applied.

The isolation of the procatalyst involves filtration, washing with a hydrocarbon solvent such as toluene and drying of the solid.

The organoaluminium cocatalyst may be trialkyl or mixed halo alkyl or alkoxo aluminium compounds usually employed with titanium procatalysts. These may be commercially available or prepared in known manner. Preferably triethyl aluminium is used.

Preferably, the mole ratio of the organomagnesium precursor to the titanium tetrachloride or titanium haloalko is 1:13.

The selectivity control agent is an ester such as p-substituted benzoate or phthalate, preferably p-ethoxy ethyl benzoate or an ether such as alkyl alkoxy or aryl alkoxy silane. Preferably dicyclohexyl dimethoxy silane or diphenyl dimethoxy silane usually employed with titanium procatalysts are used. The selectivity control agents may be commercially available or prepared in known manner. Preferably the mole ratio of the selectivity control agent to the titanium in the procatalyst is 10-75:1.

The internal electron donor may be esters of benzoic acid or diesters of phthalic acid preferably ethyl benzoate, dibutyl or diisobutyl phthalate.

The acid halide may be halide of an aliphatic or aromatic acid preferably benzoyl chloride.

Preferably the molar ratios of the electron donor and acid halide if any to titanium are 0.7 and 0.07, respectively.

The constituents of the polymerisation catalyst viz. procatalyst and cocatalyst and optionally selectivity control agent may be mixed in a vessel outside the polymerisation reactor before being transferred to the polymerisation reactor. Alternatively, the constituents may be individually transferred into the polymerisation reactor to generate the active catalyst in situ.

The lower α-alkenes used for polymerisation may be ethylene, propylene, 1-butene or 1-hexene to produce homopolymers or copolymers. Preferably ethylene or propylene is used. The polymerisation may be conducted with one or more lower α-alkene to produce homopolymers or copolymers, in the gas phase employing one or more fluidized beds of catalysts in known manner. Alternatively, the polymerisation may be conducted in the slurry phase in the absence or presence of an inert hydrocarbon diluent such as hexane in known manner.

According to the invention the polymerisation catalyst is prepared in one step reaction. This simplifies the procatalyst manufacturing procedure and reduces the batch time. The amount of titanium tetrahalide used for making the procatalyst is also reduced thereby rendering the process economical. The procatalyst prepared by the process of the invention shows high activity and selectivity, particularly in producing polymers with high isotacticity index.

The following experimental examples are illustrative of the invention but not limitative of the scope thereof.

EXAMPLE 1

Magnesium ethoxide (10 gm) and TiCl$_4$ (131 ml) diluted with chlorobenzene (131 ml) were placed inside a multi necked quartz flask equipped with nitrogen inlet, electronic temperature sensor probe and reflux condenser. The mixture was magnetically stirred and the temperature of the mixture was maintained at 110° C. for one hour under microwave radiation 300W. The yellowish solid formed was filtered, washed twice with hexane and dried under a stream of nitrogen.

EXAMPLE 2

Magnesium ethoxide (10 gm) and TiCl$_4$ (90 ml) and Ti(OBu$^n$)$_4$ (40 ml) diluted with chlorobenzene (131 ml) were placed inside a multi necked quartz flask equipped with nitrogen inlet, electronic temperature sensor probe and reflux condenser. The mixture was magnetically stirred and the temperature of the mixture was maintained at 110° C. for one hour under microwave radiation 300W. The yellowish solid formed was filtered, washed twice with hexane and dried under a stream of nitrogen.

EXAMPLE 3

Magnesium ethoxide (10 gm) and TiCl$_4$ (131 ml) diluted with chlorobenzene (131 ml) in the presence of ethyl benzoate (8.4 ml) and benzoyl chloride (0.7 ml) were placed inside a multi necked quartz flask equipped with nitrogen inlet, electronic temperature sensor probe and reflux condenser. The mixture was magnetically stirred and the temperature of the mixture was maintained at 110° C. for one hour under microwave radiation 300W. The yellowish solid formed was filtered, washed twice with hexane and dried under a stream of nitrogen.

EXAMPLE 4

Magnesium ethoxide (10 gm) and TiCl$_4$ (131 ml) diluted with chlorobenzene (131 ml) in the presence of diisobutyl phthalate (3.9 ml) and benzoyl chloride (0.7 ml) were placed inside a multi necked quartz flask equipped with nitrogen inlet, electronic temperature sensor probe and reflux condenser. The mixture was magnetically stirred and the temperature of the mixture was maintained at 110° C. for one hour under microwave radiation (300W). The yellowish solid formed was filtered, washed twice with hexane and dried under a stream of nitrogen.

EXAMPLE 5

Anhydrous magnesium chloride (10 gm) and TiCl$_4$ (131 ml) diluted with chlorobenzene (131 ml) in the presence of ethyl benzoate (8.4 ml) were placed inside a multi necked quartz flask equipped with nitrogen inlet, electronic temperature sensor probe and reflux condenser. The mixture was magnetically stirred and the temperature of the mixture was maintained at 110° C. for one and a half hour under microwave radiation 300W. The yellowish solid formed was filtered, washed twice with hexane and dried under a stream of nitrogen.

EXAMPLE 6

Anhydrous magnesium chloride (10 gm) and Ti(OBu$^n$)$_4$ (170 ml) diluted with chlorobenzene (170 ml) were placed inside a multi necked quartz flask equipped with nitrogen inlet, electronic temperature sensor probe and reflux condenser. The mixture was magnetically stirred and the temperature of the mixture was maintained a 110° C. for one and a half hour under microwave radiation 600W. The pale yellow solid formed was filtered, washed twice with hexane and dried under a stream of nitrogen.

EXAMPLE 7

In the presence of cocatalysts and for propylene in the presence of external electron donors, the procatalysts obtained in Example 1 to 6 were used for polymerization reactions of lower α-alkenes. The polymerization data are given in the following Table. The polymerization reactions were carried out under two sets of conditions: A and B. Polymerizations under conditions A were carried out in the slurry phase with hexane as the diluent under a constant pressure of 5 Kg for 1 hr at 70° C. The procatalyst (0.1 gm) was mixed with triethyl aluminium cocatalyst (1.425 gm) and for propylene either p-ethoxy ethyl benzoate (0.61 gm) or dicyclohexyl dimethoxy silane (0.15 gm) as the selectivity control agent. Polymerization under conditions B were carried out in the slurry phase with hexane as the diluent under atmospheric pressure at 30° C. The procatalyst (0.1 gm) was mixed with triethyl aluminium cocatalyst (1.425 gm) and for propylene either p-ethoxy ethyl benzoate (0.61 gm) or dicyclohexyl dimethoxy silane (0.15 gm) was used as the selectivity control agent.

TABLE

| Procatalyst | α-Alkene | Condition | Polymer yield (gm per 0.1 gm of procatalyst)/ Selectivity |
| --- | --- | --- | --- |
| Example 1 | Ethylene | A | 450 |
| Example 2 | Ethylene | A | 400 |
| Example 3 | Propylene | B | 300/96% |
| Example 4 | Propylene | B | 280/97.5% |
| Example 5 | Propylene | B | 150/96% |
| Example 6 | Ethylene | A | 350 |

The table shows that the catalyst prepared by the single step process has excellent activity and selectivity for the polymerization of ethylene and propylene.

The invention claimed is:

1. A process for the preparation of lower α-alkene polymerization heterogeneous solid catalyst, comprising mixing an organomagnesium precursor derived procatalyst having magnesium chloride supported titanium chloride and an internal electron donor with an organoaluminum compound based cocatalyst;
    wherein the mole ratio of aluminum in the cocatalyst to titanium in the procatalyst is 10-3000:1, and the procatalyst is obtained by single step reaction of the organomagnesium precursor with titanium tetrahalide or titanium haloalkoxo species of the formula Ti(OR)m Xn, wherein R is selected from the group consisting of methyl, ethyl, normal propyl, isopropyl, normal butyl, and isobutyl, X is selected from the group consisting of chlorine and bromine, and m+n=4 with the condition that when m=1 to 4, n=3 to 0 respectively, with a hydrocarbon or halohydrocarbon solvent and internal electron donor and optionally an acid halide under microwave irradiation of 300 to 1200 W followed by isolating the procatalyst, the mole ratio of the organomagnesium precursor to the titanium tetrahalide or titanium haloalko species being 1:6 to 1:20 and the mole ratios of the electron donor and acid halide to titanium being 0.3 to 1.5 and 0.02 to 0.2, respectively.

2. The process as claimed in claim 1, wherein the organomagnesium precursor is magnesium ethoxide.

3. The process as claimed in claim 1, wherein the mole ratio of the organomagnesium precursor to the titanium tetrachloride or titanium haloalkoxo species is 1:13.

4. The process as claimed in claim 1, wherein the titanium tetrahalide is titanium tetrachloride.

5. The process as claimed in claim 1, wherein the mole ratio of aluminum in the cocatalyst to titanium in the procatalyst is 200:1.

6. The process as claimed in claim 1, wherein the solvent is chlorobenzene.

7. The process as claimed in claim 1, wherein the microwave radiation of 300 W is applied.

8. The process as claimed in claim 1, wherein the aluminum compound is triethyl aluminum.

9. The process as claimed in claim 1, wherein the molar ratios of the electron donor and acid halide, if any, to titanium are 0.7 and 0.07 respectively.

10. The process as claimed in claim 1, wherein the electron donor is selected from the group consisting of ethyl benzoate, dibutyl and diisobutyl phthalate.

11. The process as claimed in claim 1, wherein the acid halide is benzoyl chloride.

12. A process for the preparation of polypropylene polymerization heterogeneous solid catalyst, comprising mixing an organomagnesium precursor derived procatalyst having magnesium chloride supported titanium chloride and an internal electron donor with an aluminum compound based cocatalyst and a selectivity control agent;

wherein the mole ratio of aluminum in the cocatalyst to titanium in the procatalyst is 10-3000 1 and the mole ratio of selectivity control agent to titanium is 10-100:1; and the procatalyst is obtained by single step reaction of organomagnesium precursor and titanium tetrahalide or titanium haloalkoxo species of the formula Ti(OR)m Xn, wherein R is selected from the group consisting of methyl, ethyl, normal propyl, isopropyl, normal butyl, and isobutyl, X is selected from the group consisting of chlorine and bromine, m=0 and n=4 with a hydrocarbon or halohydrocarbon solvent and an internal electron donor and optionally an acid halide under microwave irradiation of 300 to 1200 W followed by isolating the procatalyst, the mole ratio of the organomagnesium precursor to the titanium tetrachloride or titanium haloalko species being 1:6 to 1:20 and the mole ratios of the electron donor and acid halide to titanium being 0.3 to 1.5 and 0.02 to 0.2 respectively.

13. The process as claimed in claim 12, wherein the organomagnesium precursor is magnesium ethoxide.

14. The process as claimed in claim 12, wherein the mole ratio of the organomagnesium precursor to the titanium tetrachloride or titanium haloalkoxo species is 1:13.

15. The process as claimed in claim 12, wherein the titanium tetrahalide is titanium tetrachloride.

16. The process as claimed in claim 12, wherein the mole ratio of aluminum in the cocatalyst to titanium in the procatalyst is 200:1.

17. The process as claimed in claim 12, wherein the solvent is chlorobenzene.

18. The process as claimed in claim 12, wherein the microwave radiation of 300 W is applied.

19. The process as claimed in claim 12, wherein the organoaluminum compound is triethyl aluminum.

20. The process as claimed in claim 12, wherein the selectivity control agent is selected from the group consisting of p-ethoxy ethyl benzoate, dicyclohexyl dimethoxy silane and diphenyl dimethoxy silane.

21. The process as claimed in claim 12, wherein the mole ratio of the selectivity control agent to titanium is 10-75:1.

22. The process as claimed in claim 12, wherein the molar ratios of electron donor and acid halide, if any to titanium are 0.7 and 0.07, respectively.

23. The process as claimed in claim 12, wherein the electron donor is selected from the group consisting of ethyl benzoate, dibutyl phthalate, and diisobutyl phthalate.

24. The process as claimed in claim 12, wherein the acid halide is benzoyl chloride.

* * * * *